United States Patent [19]

White

[11] Patent Number: 5,196,120
[45] Date of Patent: Mar. 23, 1993

[54] CERAMIC-CERAMIC COMPOSITE FILTER

[75] Inventor: Lloyd R. White, Minneapolis, Minn.

[73] Assignee: Minnesota Mining and Manufacturing Company, St. Paul, Minn.

[21] Appl. No.: 863,159

[22] Filed: Apr. 2, 1992

Related U.S. Application Data

[63] Continuation of Ser. No. 698,804, May 13, 1991, abandoned.

[51] Int. Cl.[5] ............... B01D 39/06; B01D 39/20; C04B 35/76
[52] U.S. Cl. .................. 210/504; 55/523; 55/527; 210/490; 210/500.26; 210/505; 210/506; 210/508; 210/510.1; 428/34.5; 428/282; 428/368; 428/408; 428/902; 501/88; 501/89; 501/90; 501/95
[58] Field of Search ............... 210/510.1, 503, 504, 210/505, 506, 508, 497.2, 490, 500.25, 500.26; 428/280, 282, 284, 368, 408, 34.5, 902; 264/60, DIG. 48; 501/88, 89, 90, 95; 427/228, 249, 250; 55/523, 527

[56] References Cited

U.S. PATENT DOCUMENTS

| | | | |
|---|---|---|---|
| 4,275,095 | 6/1981 | Warren | 427/228 |
| 4,397,901 | 8/1983 | Warren | 428/101 |
| 4,500,328 | 2/1985 | Brassell et al. | 55/97 |
| 4,543,113 | 9/1985 | Forester et al. | 55/523 |
| 4,636,434 | 1/1987 | Okamura et al. | 428/408 |
| 4,766,013 | 8/1988 | Warren | 427/228 |
| 4,772,395 | 9/1988 | Tungatt et al. | 210/506 |
| 4,810,273 | 3/1989 | Komoda | 55/523 |
| 4,828,774 | 5/1989 | Andersson et al. | 428/311.5 |
| 4,865,739 | 9/1989 | Bauer et al. | 210/490 |
| 4,889,630 | 12/1989 | Reinhardt et al. | 210/504 |
| 4,894,070 | 1/1990 | Keidel et al. | 55/523 |
| 4,904,385 | 2/1990 | Wessling et al. | 210/490 |
| 4,917,941 | 4/1990 | Hillig et al. | 428/284 |
| 4,960,448 | 10/1990 | Zievers | 55/523 |
| 4,992,318 | 2/1991 | Gadkaree | 428/368 |
| 5,009,822 | 4/1991 | Sacks et al. | 501/89 |
| 5,059,366 | 10/1991 | Galaj et al. | 210/500.26 |
| 5,075,160 | 12/1991 | Stinton et al. | 428/282 |

FOREIGN PATENT DOCUMENTS 0322932 7/1989 European Pat. Off. .
3213951A1 10/1983 Fed. Rep. of Germany .

OTHER PUBLICATIONS

Ntis Tech Notes Dec. 1990, Springfield, Va. U.S. pp. 1107-1108 D. P. Stinton et al "Characterization of Fiber-Reinforced Particular Filters".

*Primary Examiner*—Robert A. Dawson
*Assistant Examiner*—Sun Uk Kim
*Attorney, Agent, or Firm*—Gary L. Griswold; Walter N. Kirn; Thomas J. Odar

[57] ABSTRACT

A ceramic fiber-ceramic composite filter having a support composed of ceramic fibers, preferably texturized, a carbonaceous layer thereover, and a silicon carbide coating over the carbonaceous layer and coated on substantially all of the fibers. A strong, tough, light weight filter is achieved which is especially useful in high temperature gas environments.

5 Claims, No Drawings

CERAMIC-CERAMIC COMPOSITE FILTER

This is a continuation of application Ser. No. 07/698,804, filed May 13, 1991, now abandoned.

FIELD OF THE INVENTION

This invention relates to a ceramic fiber-ceramic matrix composite filter having a porosity which allows the rapid filtration of large quantities of fluids while trapping small particulates therein.

BACKGROUND OF THE INVENTION

Ceramic-ceramic matrix composite materials are particularly useful as candle filters or baghouse filters. Candle filters are shaped like long tubes, with one open end. Such filters are fastened within an enclosure which is divided into clean and dirty sides such that the fluid to be filtered traverses from the dirty to the clean side by passing through the filter. The fluid flows typically from the outside to the inside of the filter, thus providing dust and particulate-free fluid exiting from the open end thereof.

In gas filtration, much effort has been directed to making filters capable of withstanding high temperatures and chemically corrosive environments. Ceramic materials have been found to be good candidates for filters under such conditions. However, the primary problem with ceramics is their brittleness. Hence, much of the prior art is directed to the manufacture of composite ceramic materials which, because of crack deflection and an increased flexibility, can avoid some of the traditional brittleness problems.

Many patents describe the use of ceramic materials in the filtration of particulates from hot gases. Such filters are necessary to aid in the elimination of atmospheric pollution, the recovery of desirable particulates produced in high temperature processes, such as precious metals, and the enablement of energy savings through the recycling and reuse of hot purified gas in industrial processing.

U.S. Pat. No. 4,092,194 discloses a reinforced ceramic fiber tube taught to be used as a catalyst carrier. The tube is comprised of layers of continuous ceramic fiber over which is deposited a non-porous binder comprised of an aqueous slurry of a refractory oxide precursor.

U.S. Pat. No. 4,181,514 discloses a stable filter structure for use in high temperature applications comprised of a stitch knitted high temperature fiber such as glass, ceramic or metallic yarn.

U.S. Pat. No. 4,687,697 discloses a filter of improved structural integrity wherein high temperature-resistant inorganic fibers are interlocked together to form a paper, with an inorganic fiber fabric then disposed on the paper. An adhesive is taught to hold the fabric to the paper during the formation of a pleated structure and fitting thereof into a filter frame; the adhesives and any binders that may be present are taught to burn off during use in the high temperature filtration process.

U.S. Pat. No. 4,889,630 discloses a double-layered filter wherein one layer has a coarse porosity and a second layer has a fine-grained porosity. The coarse layer is taught to be produced by forming coarse ceramic particles into a molded body followed by firing; the fine-grained layer is formed from very fine particles of ceramic materials optionally mixed with fine diameter short fibers. Materials taught to be useful for the formation of both layers include quartz, alumino-silicate, glass, aluminum oxide, silicon carbide, graphite or activated carbon, and metals.

U.S. Pat. No. 4,894,070 describes a tubular porous ceramic filter, taught to be useful for the filtration of particles from hot gases. The filter contains ceramic fibers, such as alumina, aluminosilicate, and mixtures thereof, together with a binder or colloidal oxide hydrosol. The tubes are formed by vacuum filtration of an aqueous slurry of the ceramic fibers through a wire mesh.

U.S. Pat. No. 4,917,941 discloses a ceramic composite comprised of a layer of continuous ceramic filaments surrounded by a mixture of chopped fibers, whiskers and/or particulates, which is infiltrated with a ceramic to form a matrix phase. The matrix forming material, or infiltrant, is taught to be a "meltable ceramic" (with a melting point range from about 1400° C. to about 2000° C.), which is comprised of alkaline earth silicates or alkaline earth alumino-silicates.

I have discovered that by manufacturing a filter from two separate parts, the filtering surface and an underlying support, the support, made from continuous ceramic fibers, provides strength and toughness to the filter construction. The filtering surface can then be prepared by winding ceramic fibers in a sufficient pattern to assure an appropriate pore size or by deposition of a ceramic fiber felt on the support surface. Silicon carbide is then coated onto the surface, typically by chemical vapor deposition.

In this way a filter having excellent strength and toughness is obtained. The filter is light in weight, a feature providing excellent economy since such filters are typically supported by steel framing.

SUMMARY OF THE INVENTION

A ceramic-ceramic composite filter comprised of a base or support of texturized continuous ceramic fibers fashioned into a desired shape, an optionally felt layer comprised of inorganic chopped fibers and whiskers which bridge the pores in the fibrous base, a carbonaceous layer, and a silicon carbide overlayer. The filter surface exhibits a fine porosity sufficient to filter small particles from fluids, such as hot gases, i.e., on the order of 1 to 50 micrometers, but exhibits a small pressure drop across the filter such that large quantities of fluid may be filtered rapidly, due to the support having pore diameters of greater than 100 micrometers.

DETAILED DESCRIPTION OF THE INVENTION

In the formation of the filter of my invention, bundles of ceramic fibers, known as tows, are first typically texturized by a conventional textile process which causes very fine filaments to extend from the surface of the tows, which are in essence broken fibers. Such filaments are desirable, although not absolutely necessary as they are thought to assist in locking neighboring yarns together. The tows are then (1) braided or woven into the desired shape, or (2) woven into a cloth and then formed into the desired shape, or (3) formed into the desired shape by filament winding. This ceramic fiber preform is then rigidized by the application of a phenolic resin thereto. The rigid member can be overcoated with a layer of chopped ceramic fiber, or felt, if desired, dried, and then overcoated and infiltrated with a layer of silicon carbide. The shape, typically tubular, is closed at one end, providing the look of a large test tube. Such tubes are fastened at the exit port of hot gas exhaust in order to filter particles therefrom. The filter can be manufactured into various sizes and shapes as desired.

Depending on the size of the particulate desired to be filtered, the tube can be formed into various styles of weave or braid. It can be fashioned by traditional weaving or braiding methods, or preferably formed by a method known as filament winding, a technique well known in the textile art. In some cases, a very open weave, with very large spaces (i.e., on the order of 1 mm) between the ceramic fiber tows may be desirable. Alternatively, tight weaves may be desirable for certain applications. A preferred ceramic fiber for use herein is commercially available under the NEXTEL TM brand from the 3M Company, which is comprised of aluminoborosilicate. Fibers of this type are disclosed in U.S. Pat. Nos. 3,795,524 and 4,047,965.

In order to effectively coat the ceramic fiber preform in a chemical vapor deposition (CVD) furnace, the workpiece must be rigidized, typically by applying a phenolic resin to the fibers followed by curing of the workpiece in an oven. This phenolic resin becomes pyrolyzed to form a carbonaceous layer, which must support the weight of the fiber preform during the early stages of the chemical vapor deposition process such that same does not stretch. This tendency to stretch may be further minimized by having some of the tows of ceramic fiber oriented along the long axis of the preform.

Though not wishing to be bound by theory, it is further postulated that this carbonaceous layer assists in preventing extremely good bonding between the ceramic fiber preform and the silicon carbide overcoat. Such is important because the fusion of such layers would result in a material exhibiting non-composite behavior, i.e., it would tend to be brittle and potentially exhibit catastrophic failure. One way to measure the properties of a composite is to examine same after fracture for fiber "pull-out", also known as a brushy fracture surface. Such a surface is desirable, because it indicates that the fibers have not fused together or fused to the matrix material.

The phenolic resin can be applied by a variety of techniques. For example, it can be applied by individual fiber tows during the filament winding process or before they are woven into cloth. Alternatively, the resin can be sprayed onto a completed workpiece, or same can be dipped into the resin following the winding or weaving process. The resin-coated preform is then cured in an oven typically at 190° C. for one hour, which causes the rigidization thereof.

If desired, a layer of chopped ceramic fibers may be deposited over the surface of the rigid preform by forming a slurry of such chopped fibers in a slightly viscous aqueous mixture. The open end of the preform may then be attached to a vacuum system, the preform lowered into a tank containing the suspension of chopped fibers, and vacuum applied. The liquid component of the slurry will flow through the preform with the small fibers deposited on the outside surface thereof. The preform is then removed from the tank, air dried by pulling air through same, and then dried in an oven at about 90° C. Additional phenolic resin may be applied over this felt or chopped fiber layer such that the resin is distributed throughout same, which provides additional stability to the workpiece for application of the CVD coating. The resin is then cured by placing the preform in an oven typically at 190° C. for one hour.

Commercially available fibers which can be used in the felt layer include chopped NEXTEL TM 312 and NEXTEL TM 440 fibers available from the 3M Company, Saffil alumina fibers available from ICI, and Nicalon silicon carbide fibers available from Nippon Carbon. The resultant rigidized form is placed in a CVD chamber, well known in the art, and heated resistively or by induction under vacuum. Placement in the reactor is such that gas flows from the inside to the outside while the heat source is from the outside. Such is known as a "forced flow" process which will lead to a more rapid CVD than will occur if gases pass through the preforms driven by diffusion only.

In a typical deposition process, hydrogen gas and methyltrichlorosilane (MTS) are introduced to the CVD reactor, providing silicon carbide deposition on the preform and hydrogen chloride formation as a reaction product. Byproduct and unreacted hydrogen and MTS are removed from the reactor via vacuum pumping and scrubbing mechanisms. Typical process conditions for the CVD operation are pressures of 5 to 50 torr, flow rates of from 6 to 12 standard liters per minute of MTS and hydrogen gas, and temperatures of from 1000° to 1100° C. Coating times range from 15 to 17 hours. Under such conditions, the preforms received about 160 to about 200 weight percent of silicon carbide. The fibers in the resultant composite are coated on all sides with silicon carbide, providing a high degree of infiltration of silicon carbide into the fibrous structure, essential for maximizing strength and toughness. The resultant ceramic-ceramic composite tube is a rigid, permeable composite capable of withstanding temperatures up to about 1000° C. for indefinite periods.

The invention will now be further described through the use of the following non-limiting examples.

EXAMPLE 1

This Example describes a composite made from ceramic fiber tows which had texturized, or roughened surfaces, with no additional felt layer applied to it.

The ceramic fiber preform was constructed of three filament wound plys. First, the yarn was passed through a trough containing phenolic resin (UCAR Phenolic Dispersion BKUA-2370, available from the Union Carbide Corporation) and then filament wound (while still wet with resin) over a mandrel. It was important to agitate the suspension of resin during the coating process. This was achieved by using a small peristaltic action pump to circulate the resin through the trough. Coating with the resin added about 5% of the fiber weight.

The first ply was NEXTEL TM 312 ⅛ 1800 1.5 Z yarn (trade designation of an aluminoborosilicate fiber, available from the 3M Company). The yarn was wound to form an angle of 11.78 degrees to the axis of the mandrel; the spacing between yarns was 0.159 cm (0.0625 in). This ply was comprised of 100 revolutions. The second ply was of the same yarn except that it had been texturized by exposing the finished yarn to pressurized air. The yarn formed an angle of 31.27 degrees to the axis of the mandrel; the spacing between the yarns was 0.159 cm. This ply was comprised of 86 revolutions. A third ply of the same yarn as the second ply made an angle of nearly 90 degrees with the axis of the mandrel. (This is known as a circular wrap.) Spacing between these yarns was 0.095 cm (0.0375 in). This resin-coated preform was then dried in an oven at 190° C. for one hour, resulting in a tube with an inside diameter of 5.08 cm (2 inches) and an outside diameter of about 5.4 cm (2.15 inches).

A set of four preforms was then placed in a CVD apparatus, comprising a quartz vacuum envelope, a graphite reactor, and an induction-heated coil, in such a way that gas flow was forced to go from the inside of the preform, through the preform wall, and finally through the outside surface. MTS and hydrogen gases were fed into the reactor and silicon carbide deposited on the preform. Unreacted MTS, hydrogen and hydrogen chloride, a byproduct of this reaction, exited through the scrubbing system.

Process conditions used during the first hour of CVD process were:
Temperature = 1050° C.
Pressure = 5 torr
MTS flow rate = 6 standard liters/minute
Hydrogen flow rate = 6 standard liters/minute
After one hour the following conditions applied:
Temperature = 1050° C.
Pressure = 15 torr
MTS flow rate = 12 standard liters/minute
Hydrogen flow rate = 12 standard liters/minute Low pressure was utilized during the initial stages of coating in order to insure infiltration of the preform and the deposition of silicon carbide over the surfaces of all filaments and fibers. Lower pressure enhances "throwing power", the ability to penetrate into the interior of the structure. Approximately 15 hours of CVD were needed to achieve a weight ratio of matrix/support of about 1.7-2. Experience has shown that when matrix/support weight ratios are less than about 1.7, strength of the composite material is reduced below that desired.

EXAMPLE 2

This example describes a composite wherein ceramic fiber felt is applied over a texturized ceramic fiber preform.

The ceramic fiber preform was constructed of three filament wound plys. First, the yarn was treated with phenolic resin as per Example 1. Then, the plys were formed as per Example 1 with the same materials, the only exception being that the spacing between the yarns in the outer layer was 0.159 cm (0.0625 in).

Chopped ceramic fibers were then deposited on the filament wound substrate. First, a 50/50 weight percent Nicalon (chopped, 3 mm length, 15 to 20 micrometer diameter, silicon carbide fiber)/Saffil (commercially available chopped alumina fiber, RF grade) suspension was formed by slurrying the fibers in a mixture of Methocell A4M (available from Dow Chemical and comprised of a mixture of cellulose ethers) and water. The Methocell aids in increasing the viscosity of the slurry, thus better holding the fibers in suspension and making deposition more uniform along the length of the preform. The viscosity was measured at 50 centipoise by a Brookfield viscometer. The slurry concentration was 0.00092 g fiber/cc. The slurry was poured into a 1.905 m × 38.1 cm × 25.4 (75 in × 15 in × 10 in) rectangular tank. The rigid preform was attached to a vacuum source at the open end, and lowered into the tank. Vacuum, about 17 inches of mercury, was applied suddenly, which caused the water/Methocell mixture to flow through the preform, depositing the ceramic fibers on the outside of the tube. The preform was quickly raised from the tank, and air dried by drawing air through it. This partially dried the layer of chopped fibers and helped them adhere to the preform until air dried for 24 hours and dried in an oven at 95° C. for one hour. Additional phenolic resin was then applied by spraying. This was then further cured at 190° C. for one hour. The weight of the resin was about 5% of the weight of the chopped fiber.

After this preparation, the preform was placed in the CVD apparatus of Example 1 using the same conditions.

A comparison of the filters of the Examples with a conventional filter, commercially available as a monolith, i.e., not reinforced, is presented in Tables 1 and 2. The strength and toughness of the filters of the invention are compared to the commercially available one are self-evident, as are the data relating to flow capabilities.

TABLE 1

| Filter Example | Weight and Dimensions | | | | |
|---|---|---|---|---|---|
| | Weight lb. | Length in. | OD in. | ID in. | Thickness in. |
| 1 | 2.7 | 60 | 2.2 | 2.0 | 0.1 |
| 2 | 2.9 | 60 | 2.2 | 2.0 | 0.14 |
| Monolithic | 14 | 60 | 2.38 | 1.12 | 0.6 |

TABLE 2

| Filter Example | Burst Strength and Permeability/Pressure Drop | | | | |
|---|---|---|---|---|---|
| | Bursting Pressure psi | | | Perm/Press. Drop Fpm/In. of Water | |
| | Max. | Min. | Ave | Max. | Min. |
| 1 | 551 | 505 | 538 | 0.55 | 0.29 |
| 2 | 533 | 341 | 457 | 3.5 | 2.6 |
| Monolithic | >1000 | | | 6.8 | 3.4 |

What is claimed is:

1. A ceramic fiber-ceramic composite filter comprising a base or support of at least one layer of ceramic fibers, at least some of which are texturized; a carbonaceous layer over said base; a felt layer comprising chopped ceramic fibers deposited over said carbonaceous layer; and a silicon carbide coating over said felt layer.

2. The filter of claim 1 wherein a second carbonaceous layer is laid between said felt layer and said silicon carbide coating.

3. The filter of claim 1 wherein said ceramic fibers are selected from the group consisting of aluminoborosilicate, alumina and alumino-silicate.

4. The filter of claim 1 wherein said chopped fibers are selected from the group consisting of silicon carbide, alumina, aluminoborosilicate and alumino-silicate.

5. The filter of claim 1 in the shape of a tube with one end thereof closed.

* * * * *